(12) United States Patent
Chen et al.

(10) Patent No.: US 11,101,520 B2
(45) Date of Patent: Aug. 24, 2021

(54) BATTERY MODULE AND BATTERY PACK

(71) Applicant: CONTEMPORARY AMPEREX TECHNOLOGY CO., LIMITED, Ningde (CN)

(72) Inventors: Xingdi Chen, Ningde (CN); Peng Wang, Ningde (CN); Linggang Zhou, Ningde (CN); Yanhuo Xiang, Ningde (CN); Kaijie You, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 163 days.

(21) Appl. No.: 16/506,301

(22) Filed: Jul. 9, 2019

(65) Prior Publication Data
US 2020/0303695 A1   Sep. 24, 2020

(30) Foreign Application Priority Data
Mar. 19, 2019   (CN) .......................... 201910212474.5

(51) Int. Cl.
*H01M 50/20*   (2021.01)
(52) U.S. Cl.
CPC ................................. *H01M 50/20* (2021.01)
(58) Field of Classification Search
CPC .. H01M 50/20; H01M 50/103; H01M 50/502; H01M 10/653; H01M 10/647; H01M 10/613; H01M 10/6554; H01M 10/0431; H01M 10/0481; H01M 10/0413; Y02E 60/10
See application file for complete search history.

(56) References Cited

U.S. PATENT DOCUMENTS

| | | | |
|---|---|---|---|
| 2004/0033415 A1 | 2/2004 | Chen et al. | |
| 2007/0018610 A1 | 1/2007 | Wegner | |
| 2011/0311848 A1* | 12/2011 | Garascia | B60K 5/08 429/87 |
| 2012/0021260 A1* | 1/2012 | Yasui | H01M 10/6554 429/53 |
| 2012/0129024 A1 | 5/2012 | Marchio et al. | |

(Continued)

OTHER PUBLICATIONS

European Search Report for corresponding European Patent Application No. 19181894.7, dated Jan. 27, 2020, 4 pages.

*Primary Examiner* — Matthew T Martin
(74) *Attorney, Agent, or Firm* — Tucker Ellis LLP

(57) ABSTRACT

The present disclosure relates to a battery module including a plurality of battery unit array structures and a battery container body. The battery container body includes a first container body and a second container body that are in a split structure. The first container body is disposed at a side of the second container body and provided with a first accommodating cavity. The second container body is provided with a second accommodating cavity. The plurality of battery unit array structures is disposed between the first container body and the second container body by means of a mutual cooperation of the first accommodating cavity and the second accommodating cavity. Compared with the related art, since the first or second container body is used for transportation, it is unnecessary to introduce an additional component, thereby enhancing the energy density of the battery module.

14 Claims, 8 Drawing Sheets

(56) References Cited

U.S. PATENT DOCUMENTS

2012/0270081 A1* 10/2012 Horii ................. H01M 10/6556
 429/72
2014/0370367 A1* 12/2014 Higuchi .............. H01M 50/502
 429/158
2018/0358664 A1  12/2018 Zhang et al.

* cited by examiner

BATTERY MODULE AND BATTERY PACK

CROSS-REFERENCE TO RELATED APPLICATIONS

The present application claims priority to Chinese Patent Application No. 201910212474.5, filed on Mar. 19, 2019, the content of which is incorporated herein by reference in its entirety.

TECHNICAL FIELD

The present disclosure relates to the technical field of battery, and in particular, relates to a battery module and a battery pack.

BACKGROUND

The secondary battery has been widely used in various fields such as new energy vehicles and energy storage power stations, due to its advantages of high energy density, long service life, energy saving, environmental protection and the like.

A battery module includes a battery unit array structure, a busbar, an upper cover and a lower cover. The battery unit array structure includes a plurality of battery units and a plurality of busbars electrically connected to the plurality of battery units. The battery unit array structure is accommodated in an accommodating cavity enclosed by the upper cover and the lower cover. When assembling the battery module, if the battery unit array structure is first formed by fixing the plurality of battery units and connecting them to the plurality of busbars and then transported to the accommodating cavity, an additional component for the transportation is required to be provided on the battery unit array structure, which reduces the energy density of the battery module.

In this regard, when assembling the battery module, the plurality of battery units is first sequentially accommodated in the accommodating cavity and fixed and then connected to the plurality of busbars. However, if the battery module includes a plurality of battery unit array structures and a distance between the plurality of battery unit array structures is relatively small, there is no operating space remained for the tool for connecting the busbars, and thus it is extremely difficult to connect the busbars.

SUMMARY

In view of above, the present disclosure provides a battery module and a battery pack, for solving the technical problems in the related art.

According to a first aspect of the present disclosure, a battery module is provided. The battery module includes: a plurality of battery unit array structures, each of the plurality of battery unit array structures including a plurality of battery units arranged along a length direction and a plurality of busbars electrically connected to the plurality of battery units; and a battery container body, the battery container body includes a first container body and a second container body that are in a split structure, the first container body is disposed at a side of the second container body in a width direction, the first container body is provided with a first accommodating cavity, and the second container body is provided with a second accommodating cavity. The plurality of battery unit array structures includes at least one first battery unit array structure and at least one second battery unit array structure. The at least one first battery unit array structure is disposed in the first accommodating cavity, and the at least one second battery unit array structure is disposed in the second accommodating cavity.

As a preferable structure according to the present disclosure, each of the plurality of battery units includes a battery casing, a cover plate, and electrode terminals. The cover plate is connected to the battery casing, the electrode terminals are provided on the cover plate and electrically connected to the plurality of busbars. The electrode terminals of the at least one first battery unit array structure face towards or away from the at least one second battery unit array structure, and/or the electrode terminals of the at least one second battery unit array structure face towards or away from the at least one first battery unit array structure.

As a preferable structure according to the present disclosure, the electrode terminals of the at least one first battery unit array structure face towards the at least one second battery unit array structure, and the electrode terminals of the at least one second battery unit array structure face towards the at least one first battery unit array structure.

As a preferable structure according to the present disclosure, each of the plurality of battery units includes an electrode assembly accommodated in a battery casing, and the electrode assembly includes a first electrode plate, a second electrode plate, and a separator disposed between the first electrode plate and the second electrode plate. The electrode assembly is in a wound structure, and outer surfaces of the electrode assembly includes two flat surfaces face to each other in a vertical direction; or the electrode assembly is in a layered structure in which the first electrode plate, the separator and the second electrode plate are stacked in the vertical direction.

As a preferable structure according to the present disclosure, the first container body includes a first upper cover portion and a first carrying portion, the first upper cover portion is disposed above the first carrying portion, and the first accommodating cavity is formed between the first upper cover portion and the first carrying portion; and/or the second container body includes a second upper cover portion and a second carrying portion, the second upper cover portion is disposed above the second carrying portion, and the second accommodating cavity being formed between the second upper cover portion and the second carrying portion.

As a preferable structure according to the present disclosure, the first container body further includes a first connecting portion disposed vertically, the first upper cover portion is connected to the first carrying portion through the first connecting portion, and the first connecting portion is disposed at a side of the at least one first battery unit array structure facing away from the at least one second battery unit array structure; and/or the second container body further includes a second connecting portion disposed vertically, the second upper cover portion is connected to the second carrying portion through the second connecting portion, and the second connecting portion is disposed at a side of the at least one second battery unit array structure facing away from the at least one first battery unit array structure.

As a preferable structure according to the present disclosure, the first upper cover portion and the second upper cover portion are connected by welding, riveting, bonding or screwing; and/or the first carrying portion and the second carrying portion are connected by welding, riveting or bonding or screwing.

As a preferable structure according to the present disclosure, the battery module further includes a fixing component. The first carrying portion is connected to the second carrying portion through the fixing component.

As a preferable structure according to the present disclosure, the fixing component is a cooling plate. The first carrying portion and the second carrying portion are respectively connected to the fixing component with heat-conducting glue.

As a preferable structure according to the present disclosure, the at least one first battery unit array structure is bonded to the first carrying portion through glue, and the at least one second battery unit array structure is bonded to the second carrying portion.

As a preferable structure according to the present disclosure, the at least one first battery unit array structures includes two or more first battery unit array structures arranged in a vertical direction, and the at least one second battery unit array structure includes two or more second battery unit array structures arranged in the vertical direction.

As a preferable structure according to the present disclosure, a first opening is provided at an end of the first container body facing towards the second container body, and a second opening is provided at an end of the second container body facing the first container body, and the first opening is disposed opposite to the second opening.

Different from the related art, the battery container bodies include the first container body and the second container body that are in a split structure; the first container body is disposed at a side of the second container body in the width direction, the first container body is provided with the first accommodating cavity, and the second container body is provided with the second accommodating cavity. Therefore, the plurality of battery units can be first placed into the first accommodating cavity sequentially to be fixed on the first container body, then connected to the plurality of busbars, and transported by means of the first container body. The plurality of battery units can be placed into the second accommodating cavity sequentially in the same way. In this case, as the first container body and the second container body can be used for transportation, it is unnecessary to introduce an additional component, thereby enhancing the enemy density of the battery module 1.

In order to solve the above problems, according a second aspect of the present disclosure, a battery pack is provided. The battery pack includes an accommodating box, and a plurality of battery module according to the first aspect.

As a preferable structure according to the present disclosure, the first container body includes a first fixing portion extending in a direction facing away from the at least one second battery unit array structure, and the second container body includes a second fixing portion extending in a direction facing away from the at least one first battery unit array structure. The accommodating box includes a box cover and a box body. The box body is provided with a first fixing beam and a second fixing beam, and the first fixing beam and the second fixing beam protrude from a surface of the box body. The first fixing portion is disposed opposite to the first fixing beam, and the first fixing portion is fixed to the first fixing beam (31). The second fixing portion is disposed opposite to the second fixing beam, and the second fixing portion is fixed to the second fixing beam.

As a preferable structure according to the present disclosure, the battery module further includes two pressing bars. The first fixing portion is pressed between one of the two pressing bars and the first fixing beam, and the second fixing portion is pressed between the other one of the two pressing bars and the second fixing beam.

Different from the related art, the battery container bodies include the first container body and the second container body that are in a split structure; the first container body is disposed at a side of the second container body in the width direction, the first container body is provided with the first accommodating cavity, and the second container body is provided with the second accommodating cavity. Therefore, the plurality of battery units can be first placed into the first accommodating cavity sequentially to be fixed on the first container body, then connected to the plurality of busbars, and transported by means of the first container body. The plurality of battery units can be placed into the second accommodating cavity sequentially in the same way. In this case, as the first container body and the second container body can be used for transportation, it is unnecessary to introduce an additional component, thereby enhancing the energy density of the battery module 1.

Figure 1:
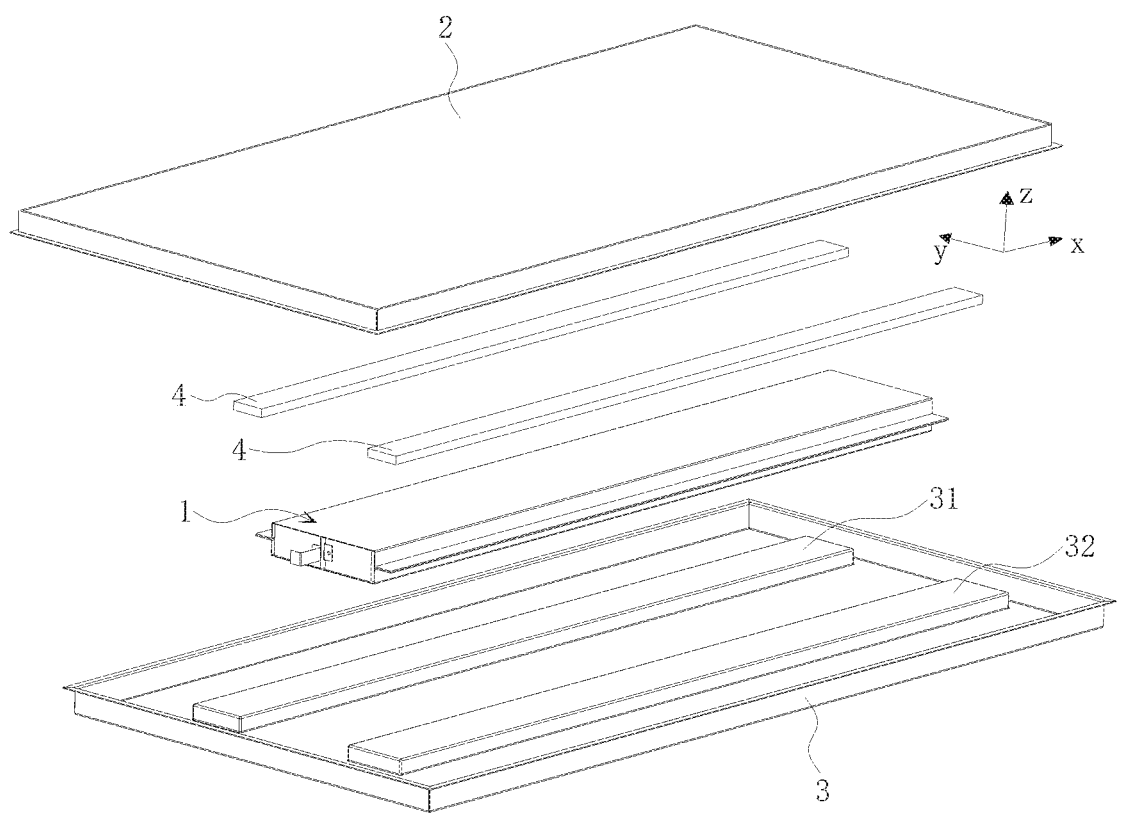
FIG. 1 is an exploded view of a battery pack according to a specific embodiment.

REFERENCE SINGS 1. battery module
  10 battery unit array structure
    101 first battery unit array structure
    102 second battery unit array structure
  11 battery unit
    111 battery assembly
      1111 first electrode plate
      1112 second electrode plate
      1113 separator
      1114 flat surface
    112 battery casing
      1121 first surface
      1122 second surface
    113 electrode terminal connector
    114 cover plate
    115 electrode terminal
    116 vent 12 busbar
13 first container body
   130 first accommodating cavity
   131 first upper cover portion
   132 first carrying portion
   133 first connecting portion
   134 first fixing portion
14 second container body
   140 second accommodating cavity
   141 second upper cover portion
   142 second carrying portion
   143 second connecting portion
   144 second fixing portion
15 collecting plate
16 end plate
17 fixing component
2 box cover
3 box body
   31 first fixing beam
   32 second fixing beam
4 pressing bar

DESCRIPTION OF EMBODIMENTS

The technical solutions will be described in detail below with reference to specific embodiments and accompanying drawings in term of technical content, structural features, and objects and effects.

The terms "first", or "second" in the description are used for a purpose of description only, but not intended to indicate or imply relative importance thereof. Unless otherwise specified or stated, term "a plurality of" means two or more, terms "connected", "fixed", etc. shall be understood in a broad sense. For example, the term "connected" includes various connection manners, such as fixed connection, detachable connection, integrated connection, electrical connection, direct connection or indirect connection via an intermediate medium. These skilled in the art are able to understand specific meanings of the above terms in accordance with specific circumstances.

It should be understood that terms indicating orientations or positions, such as "upper", "lower", "left", "right", etc., generally are used to describe the orientations or positions with reference to the drawings, and thus should not be construed as a limitation of the present disclosure. It also should be understood that when an element is referred as being "on" or "under" another element, the element can be directly located "on" or "under" another element or connected to another element with an intermediate element.

Figure 2:
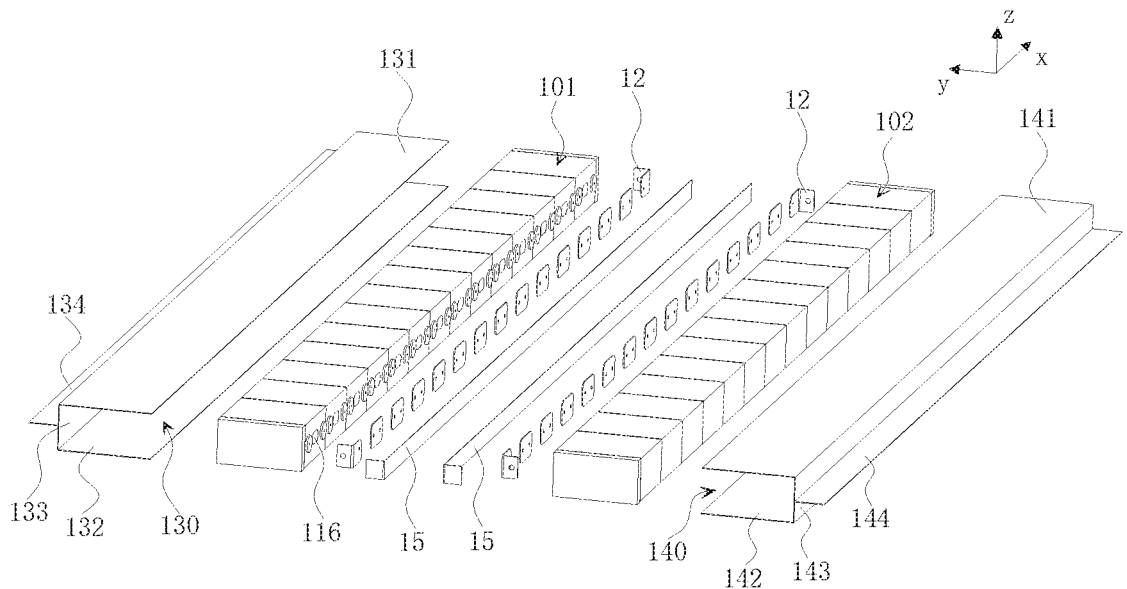
FIG. 2 is an exploded view of two battery unit array structures according to a first embodiment.

FIG. 1 and FIG. 2 illustrate a battery pack according to an embodiment. The battery pack includes an accommodating box and a plurality of battery modules 1 disposed in the accommodating box. The plurality of battery modules 1 can be arranged either along a horizontal direction (a length direction indicated by arrow x or a width direction indicated by arrow y), or along a vertical direction (a direction indicated by arrow z).

In an embodiment, the accommodating box includes a box cover 2 and a box body 3. The box body 3 is provided with a plurality of first fixing beams 31 and a plurality of second fixing beams 32. The first fixing beams 31 and the second fixing beams 32 protrude from a surface of the box body 3, and are substantially parallel to each other.

In other embodiments, the first fixing beam 31 can also be provided on the box cover 2. In the present embodiment, the first fixing beam 31 can be protruding beams that protrude upwards from the bottom of the box body 3, or act as separate components that are welded on the bottom of the box body 3.

In an embodiment, the battery pack further includes pressing bars 4. The pressing bars 4 press both ends of the battery module 1 against the first fixing beam 31 and the second fixing beam 3'2, so as to fix the battery module 1 onto the box body 3. In this case, the battery module 1 is fixed by the pressing bars 4.

In the present embodiment, the first container body 13 of the battery module 1 includes a first fixing portion 134 extending in a direction facing away from a second battery unit array structure 102, and the second container body 14 of the battery module 1 includes a second fixing portion 144 extending in a direction facing away from a first battery unit array structure 101. The first fixing portion 134 and the first fixing beam 31 are disposed opposite to one another, and the first fixing portion 134 is fixed on the first fixing beam 31. The second fixing portion 144 and the second fixing beam 32 are disposed opposite to each other, and the second fixing portion 144 is fixed on the second fixing beam 32.

As shown in FIG. 1, the first fixing portion 134 is tightly pressed between the pressing bar 4 and the first fixing beam 31 to fix one end of the battery module 1 onto the box body 3. The second fixing portion 144 is tightly pressed between the pressing bar 4 and the second fixing beam 32 to fix the other end of the battery module 1 onto the box body 3. It should be noted that the fixing of the battery module 1 to the box body 3 is not limited to the manner using the pressing bars 4 as described in the present embodiment, and it can also adopt screwing, welding, riveting or the like fixing manner.

Figure 3:
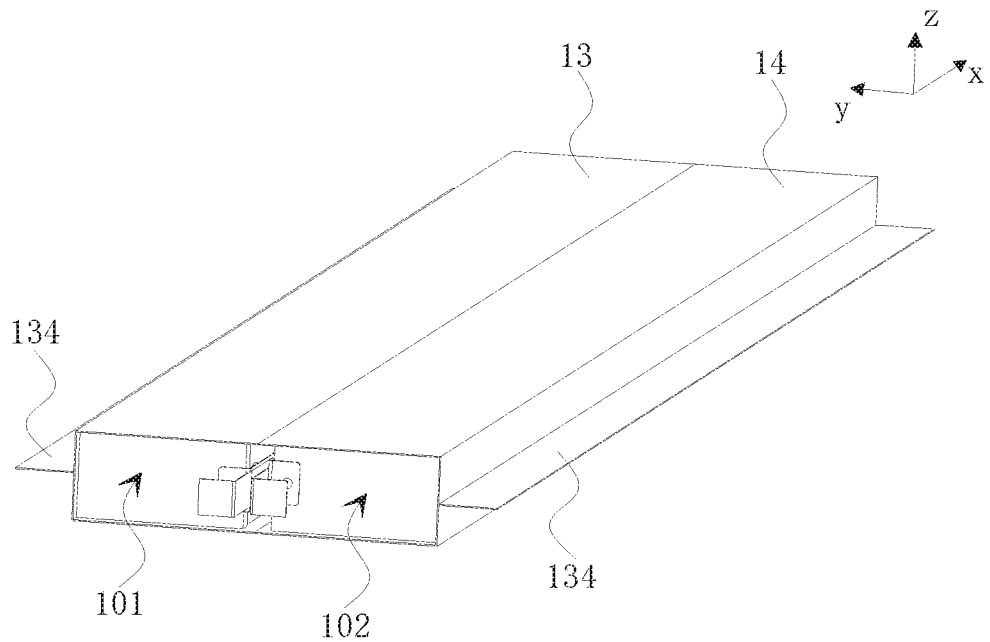
FIG. 3 is a schematic assembled diagram of the two battery unit array structures according to the first embodiment.
Figure 4:
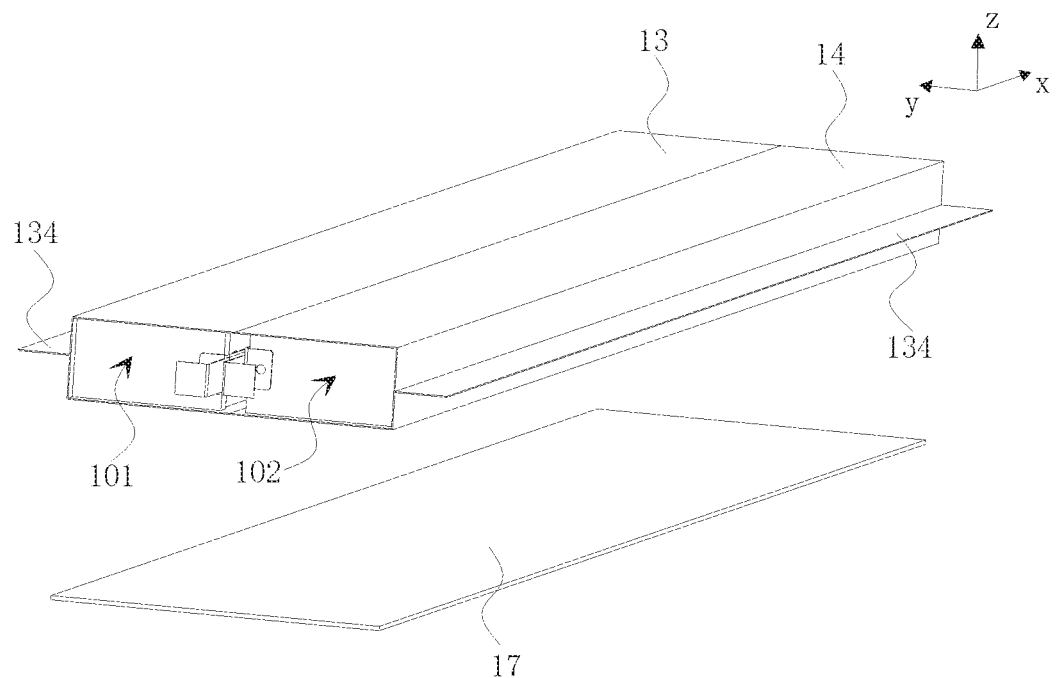
FIG. 4 is a schematic assembled diagram of the battery module according to the first embodiment with a fixing component.

In a first embodiment as shown in FIG. 2 to FIG. 4, the battery module 1 includes two or more battery unit array structures 10 and battery container bodies. One of the battery unit array structures 10 is a first battery unit array structure 101, and another of the battery unit array structures 10 is a second battery unit array structure 102. The first battery unit array structure 101 is disposed in a first accommodating cavity 130, and the second battery unit array structure 102 is disposed in a second accommodating cavity 140.

The battery container bodies include a first container body 13 and a second container body 14. The first container body 13 and the second container body 14 are in a split structure. The first container body 13 is disposed at a side of the second container body 14 in a width direction, the first container body 13 is provided with the first accommodating cavity 130, and the second container body 14 is provided with the second accommodating cavity 140. A first opening is provided at an end of the first container body 13 facing towards the second container body 14, and a second opening is provided at an end of the second container body 14 facing towards the first container body 13. The first opening and the second opening are opposite to one another. The first accommodating cavity 130 can communicate with the second accommodating cavity 140 through the first opening and the second opening.

The battery module 1 can include two or more battery unit array structures 10. One of the battery unit array structures 10 is the first battery unit array structure 101, and another of the battery unit array structures 10 is the second battery unit array structure 102. The first battery unit array structure 101 is disposed in the first accommodating cavity 130, and the second battery unit array structure 102 is disposed in the second accommodating cavity 140.

In an embodiment, the first container body 13 includes a first upper cover portion 131 and a first carrying portion 132. The first upper cover portion 131 is disposed above the first carrying portion 132. The first accommodating cavity 130 is formed between the first upper cover portion 131 and the first carrying portion 132.

In an embodiment, the second container body 14 includes a second upper cover portion 141 and a second carrying portion 142. The second upper cover portion 141 is disposed above the second carrying portion 142. The second accommodating cavity 140 is formed between the second upper cover portion 141 and the second carrying portion 142.

The first container body 13 and the second container body 14 are in a split structure. The split structure mentioned herein means that first container body 13 and the second container body 14 are not manufactured with the same sheet material. That is, the first container body 13 and the second container body 14 are two separate components.

In the present embodiment, the first carrying portion 131 and the second carrying portion 142 both are configured to carry the battery unit array structure 10. In an example, the first battery unit array structure 101 is bonded to the first carrying portion 132 through glue, and the second battery unit array structure 102 is bonded to the second carrying portion 142 through glue.

In an example, each of the first upper cover portion 131 and the first carrying portion 132 has a length and a width extending in the horizontal direction (the length direction indicated by arrow x or the width direction indicated by arrow y), and the length and the width are approximately equal to a length and a width of the first battery unit array structure 101 extending in the horizontal direction, respectively. Similarly, each of the upper cover portion 141 and the second carrying portion 142 has a length and a width extending in the horizontal direction (the length direction indicated by arrow x or the width direction indicated by arrow y), and the length and width are approximately equal to a length and a width of the second battery unit array structure 102 extending in the horizontal direction, respectively.

It should be understood that, the lengths and the widths of the first upper cover portion 131 and the first carrying portion 132, as well as the lengths and the widths of the lower upper cover portion 141 and the second carrying portion 142 are not limited to the above embodiment. It is also possible that the length of the first upper cover portion 131 and the length of the first carrying portion 132 are greater or smaller than the length of the first battery unit array structure 101, and the width of the first upper cover portion 131 and the width of the first carrying portion 132 are greater or smaller than the width of the first battery unit array structure 101. Similarly, it is also possible that the length of the second upper cover portion 141 and the length of the second carrying portion 142 are greater or smaller than the length of the first battery unit array structure 101, and the width of the second upper cover portion 141 and the width of the second carrying portion 142 are greater or smaller than the width of the second battery unit array structure 102.

As shown in FIG. 2, the battery unit array structure 10 includes a plurality of battery units 11 arranged along a length direction x, and a plurality of busbars 12 electrically connected to the plurality of battery units 11. A collecting plate 15 is vertically disposed at a side of the battery unit array structure 10, and the collecting plate 15 is connected to the battery units 11 in the battery unit array structure 10.

The battery unit 11 includes a battery casing 112, a cover plate 114, and electrode terminals 115. The cover plate 114 is connected to the battery casing 112. The electrode terminals 115 are provided on the cover plate 114 and electrically connected to the busbars 12. The electrode terminals 115 of the first battery unit array structure 101 face towards or away from the second battery unit array structure 102, and the electrode terminals 115 of the second battery unit array structure 102 face towards or away from the first battery unit array structure 101.

As shown in FIG. 2, the electrode terminals 115 of the first battery unit array structure 101 face towards the second battery unit array structure 102, and the electrode terminals 115 of the second battery unit array structure 102 face towards the first battery unit array structure 101. In this case, such arrangement facilitates the welding of the busbars 12 of the battery units 11 of the first battery unit array structure 101 and the second battery unit structure 102, and reduces a distance between the electrode terminals 115 of the first battery unit array structure 101 and the electrode terminals 115 of the second battery unit array structure 102, thereby enhancing the energy density of the battery module 1.

During the assembling process of the battery module 1, the plurality of battery units 11 of the first battery unit array structure 101 is sequentially placed into the first accommodating cavity 130 to fix on the first container body 13, then connected to a plurality of busbars 12, and transported by means of the first container body 13.

Then, the plurality of battery units 11 of the second battery unit array structure 102 is sequentially placed into the second accommodating cavity 140 to fix on the second container body 14, then connected to a plurality of busbars 12, and transported by means of the second container body 14.

Finally, the first container body 13 and the second container body 14 are connected to one another to finish the assembling of the battery module 1. The assembled battery module 1 is shown in FIG. 3. When the battery module 1 is assembled, the first container body 13 and the second container body 14 can be in a fixed connection or an unfixed connection.

In this case, since the first container body 13 and the second container body 14 can be used for transportation, it is unnecessary to introduce an additional component, thereby enhancing the energy density of the battery module 1.

In an example, the first container body 13 further includes a first connecting portion 133 disposed vertically (as the direction indicated by arrow z). The first upper cover portion 131 is connected to the first carrying portion 132 through the first connecting portion 133, and the first connecting portion 133 is disposed at a side of the first battery unit array structure 101 facing away from the second battery unit array structure 102.

The second container body 14 further includes a second connecting portion 143 disposed vertically (as the direction indicated by arrow z). The second upper cover portion 141 is connected to the second carrying portion 142 through the second connecting portion 143, and the second connecting portion 143 is disposed at a side of the second battery unit array structure 102 facing away from the first battery unit array structure 101.

In the present embodiment, the electrode terminals 115 of the first battery unit array structure 101 face away from the first connecting portion 133, and the electrode terminals 115 of the second battery unit array structure 102 face away from the second connecting portion 143.

In an example, the first upper cover portion 131 and the second upper cover portion 141 are connected by welding, riveting or bonding. The first carrying portion 132 and the second carrying portion 142 are connected by welding, riveting or bonding.

In other embodiments, the first upper cover portion 131 can be fixed to the second upper cover portion 141 via a bridging structure, and similarly, the first carrying portion 132 can be fixed to the second carrying portion 142 by a bridging structure.

In an example as shown in FIG. 4, the battery module 1 further includes a fixing component 17. The first carrying portion 132 is connected to the second carrying portion 142 through the fixing component 17. In this way, by means of the fixing component 17, the first carrying portion 132 and the second carrying portion 142 are connected to each other.

In an embodiment, the fixing component 17 is a cooling plate, and the first carrying portion 132 and the second carrying portion 142 are respectively connected to the fixing component 17 with heat-conducting glue. In this case, the fixing member 17 is a cooling plate, and the first carrying portion 132 and the second carrying portion 142 are fixedly connected to the fixing member 17 by heat-conducting glue, respectively. In this way, the heat generated by the battery units 11 is transferred to the cooling plate via the first carrying portion 132 (or the second carrying portion 142) and the heat-conducting glue, and thus the battery units 11 are cooled by the cooling plate. It should be noted that the fixing component 17 is not limited to the implementation in form of the cooling plate, but can adopt other forms.

Figure 5:
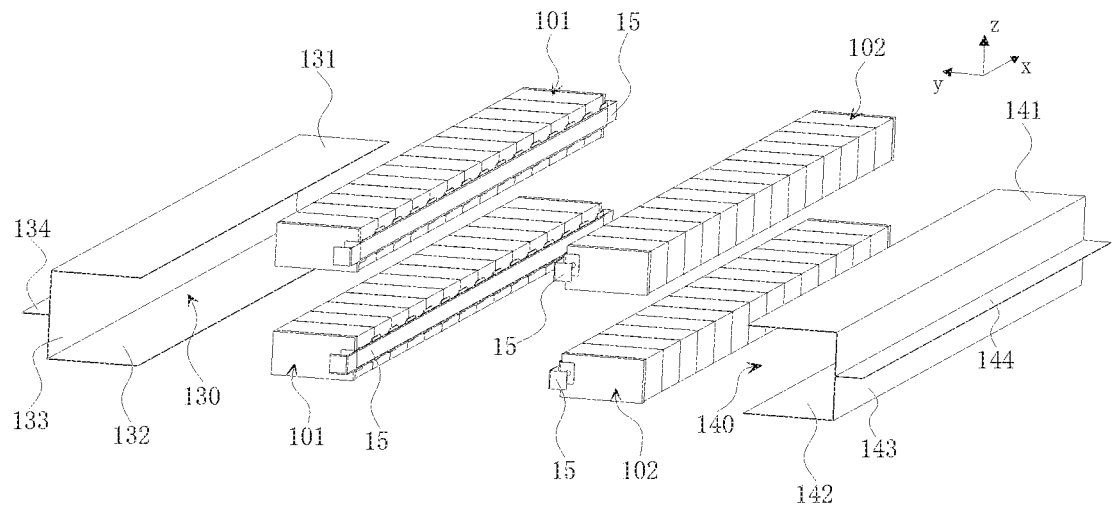
FIG. 5 is an exploded view of four battery unit array structures according to a second embodiment.
Figure 6:
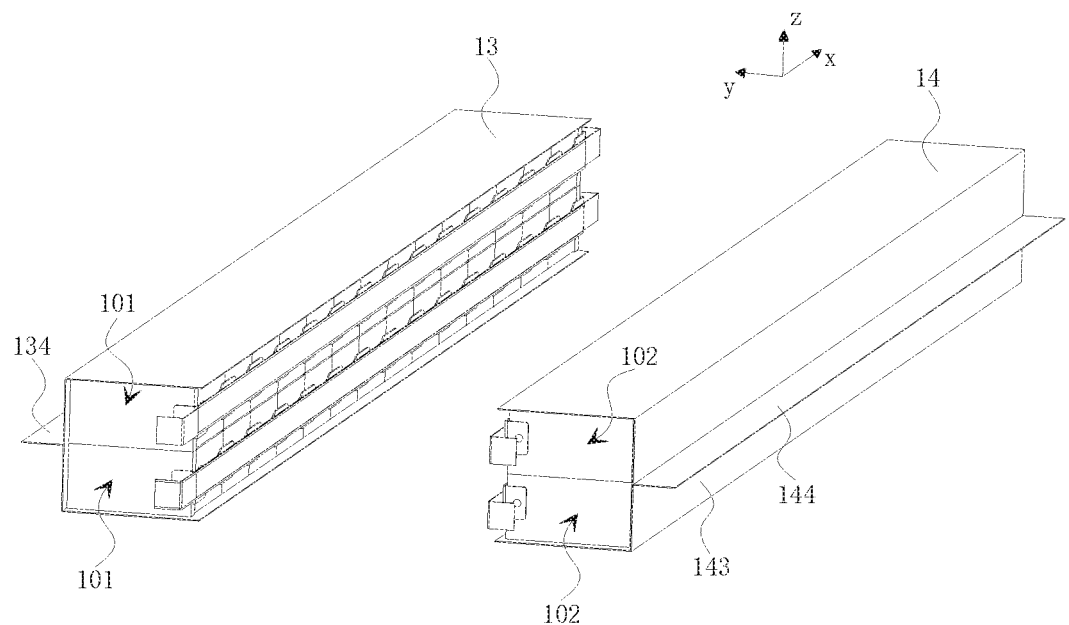
FIG. 6 is a schematic assembled diagram of the four battery unit array structures according to the second embodiment.

In a second embodiment, the battery module 1 includes two or more battery unit array structures 10 arranged in the vertical direction (the direction indicated by arrow z). As show in FIG. 5 and FIG. 6, the battery module 1 includes two first battery unit array structures 101 arranged in the vertical direction (the direction indicated by arrow z), two second battery unit array structures 102 arranged in the vertical direction (the direction indicated by arrow z), and battery container bodies.

The two first battery unit array structures 101 are disposed in the first accommodating cavity 130, and the two second battery unit array structures 102 are disposed in the second accommodating cavity 140. The battery module 1 is not limited to that having two first battery/unit array structures 101 and two second battery unit array structures 102, but can also be that having three or four first battery unit array structures 101 or that having three or four second battery unit array structures 102.

Figure 7:
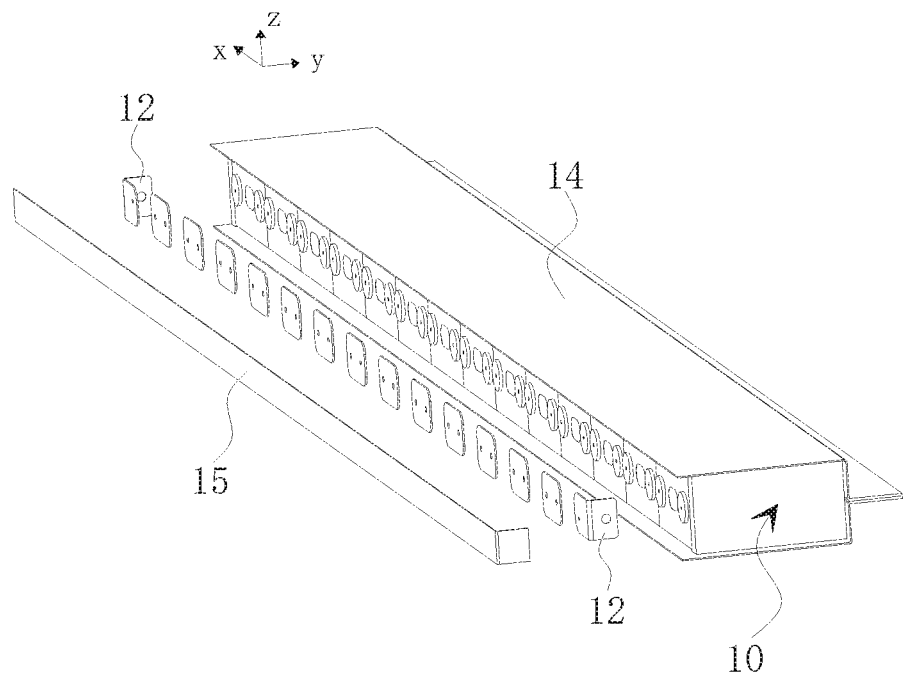
FIG. 7 is a schematic structural diagram of a battery unit array structure with a first box body according to a specific embodiment.

As show in FIG. 7, the plurality of battery units 11 of the battery unit array structure 10 is first placed into and fixed in the second container body 14, then connected to the plurality of busbars 12 and transported by means of the second container body 14. In this case, since the second container body 14 is used for transportation, it is unnecessary to introduce an additional component, thereby enhancing the energy density of the battery module 1.

Figure 8:
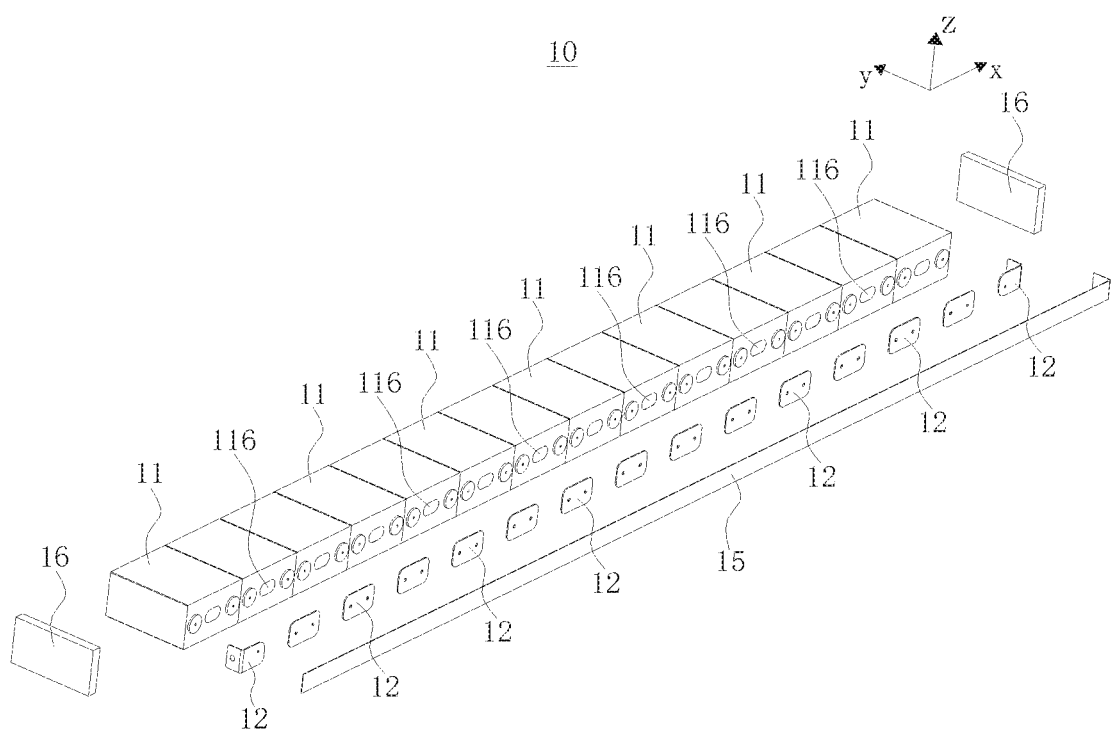
FIG. 8 is an exploded view of a battery unit array structure according to a specific embodiment.
Figure 9:
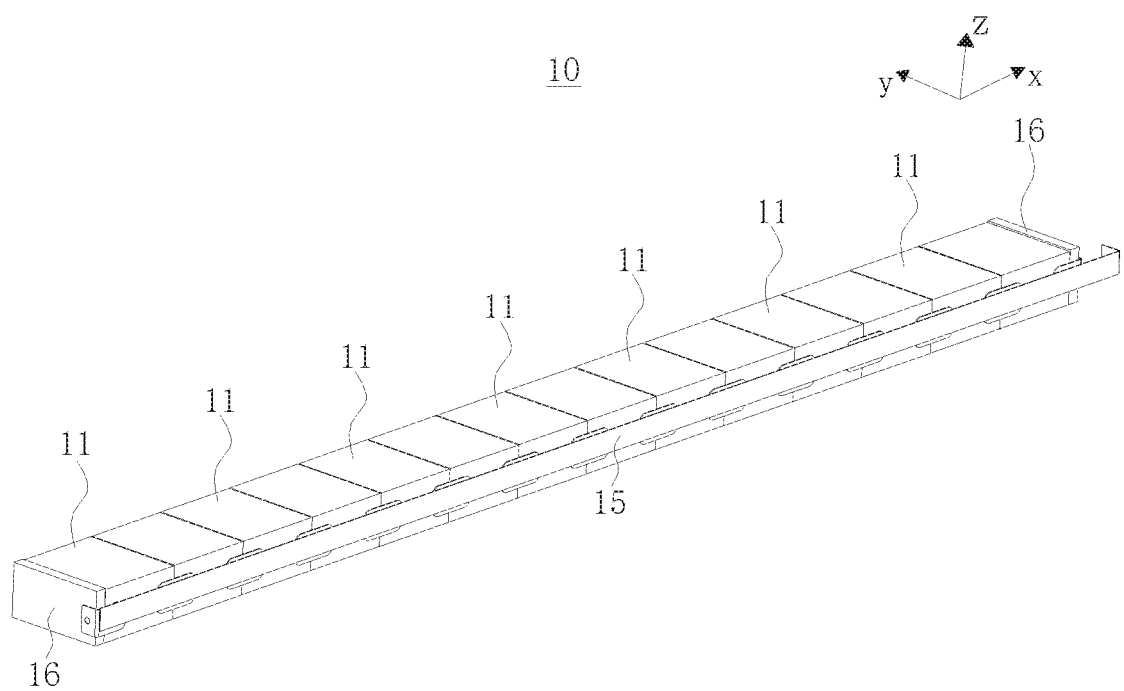
FIG. 9 is a schematic structural diagram of a battery unit array structure according to a specific embodiment.

In an embodiment as shown in FIG. 8 and FIG. 9, the battery unit array structure 10 includes a plurality of battery units 11 arranged along the length direction x, and a plurality of busbars 12 electrically connected to the plurality of battery units 11. The collecting plate 15 is vertically disposed at a side of the battery unit array structure 10, and the collecting plate 15 is connected to the electrode terminals 115 in the battery unit array structure 10.

In the present embodiment, the battery unit array structure 10 further includes two end plates 16, and the two end plates 16 are respectively located at two ends of the plurality of battery units 11 in the length direction x.

In a specific embodiment, a side surface of the battery unit 11 is applied with glue and is bonded to an adjacent battery unit 11. The plurality of battery units 11 is provided with the end plates 16 at the two ends, and the plurality of battery units 11 is bonded to the end plates 16 by glue. The plurality of battery units 11 is electrically connected to one another via the busbars 12.

Figure 10:
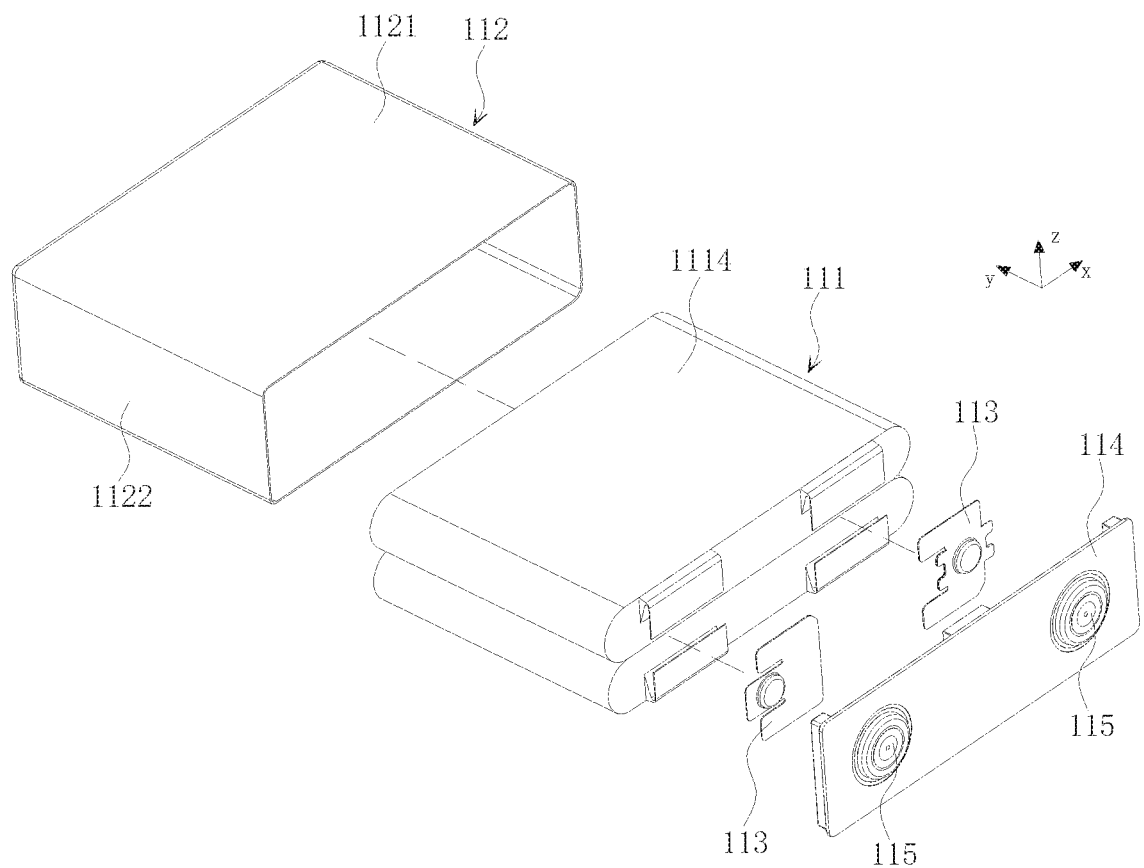
FIG. 10 is an exploded view of a battery unit according to a specific embodiment.

As shown in FIG. 10, the battery unit 11 includes an electrode assembly 111, a battery casing 112, electrode terminal connectors 113, a cover plate 114, and electrode terminals 115. The battery casing 112 can have a hexahedral shape or any other shape. The battery casing 112 has an inner space for accommodating the electrode assembly 111 and the electrolyte, and an opening. The electrode assembly 111 is accommodated in the battery casing 112, the cover plate 114 covers the opening and configured to enclose the electrode assembly 111 in the battery casing 112, and the electrode assembly 111 is electrically connected to the electrode terminals 115 through the electrode terminal connectors 113. In the present embodiment, there are two electrode terminal connectors 113, i.e., a positive terminal connector 113 and a negative terminal connector 113. The battery casing 112 can be made of a material such as aluminum, aluminum alloy, or plastic.

The electrode assembly 111 is accommodated in the battery casing 112 and includes a first electrode plate 1111, a second electrode plate 1112 and a separator 1113 disposed between the first electrode plate 1111 and the second electrode plate 1112. The first electrode plate 1111 is a positive electrode plate or a negative electrode plate, and the second electrode plate 1112 has an opposite polarity to the first electrode plate 1111, i.e., the second electrode plate 1112 is a negative electrode plate or a positive electrode plate. The separator 1113 is an insulator interposed between the first electrode plate 1111 and the second electrode plate 1112. The electrode assembly 111 can be in form of a wound structure (as shown in FIG. 11) or a layered structure (as shown in FIG. 12).

For purpose of illustration, the first electrode plate 1111 is a positive electrode plate and the second electrode plate 1112 is a negative electrode plate. In other embodiments, it is also possible that the first electrode plate 1111 is a negative electrode plate and the second electrode plate 1112 is a positive electrode plate. In addition, a positive electrode active material is coated on a coating region of the positive electrode plate, and a negative electrode active material is coated on a coating region of the negative electrode plate. An uncoated region extending from each coating region acts as a tab. The electrode assembly 111 includes two tabs. i.e., a positive tab and a negative tab. The positive tab extends from the coating region of the positive electrode plate, and the negative tab extends from the coating region of the negative electrode plate. The positive electrode tab is electrically connected to the positive electrode terminal 115 through the positive electrode terminal connector 113, and the negative electrode tab is electrically connected to the negative electrode terminal 115 through the negative electrode terminal connector 113.

The battery casing 112, in an approximately hexahedral form, includes two first surfaces 1121 and two second surfaces 1122. Each of the first surfaces 1121 has a larger area than each of the second surfaces 1122. In the battery module 1, the two second surfaces 1122 of each battery unit 11 are opposite to each other in the length direction x, and the two first surfaces 1121 of each battery unit 11 are opposite to each other in the vertical direction (the direction indicated by arrow z).

Figure 11:
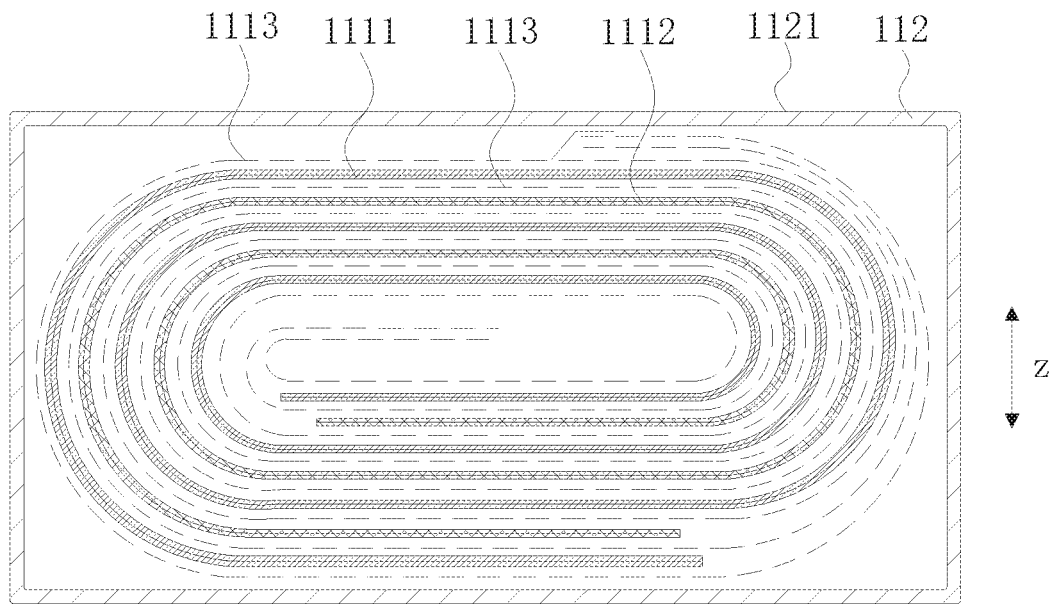
FIG. 11 is a cross-sectional view of a battery assembly in form of a wound structure according to a specific embodiment.
Figure 12:
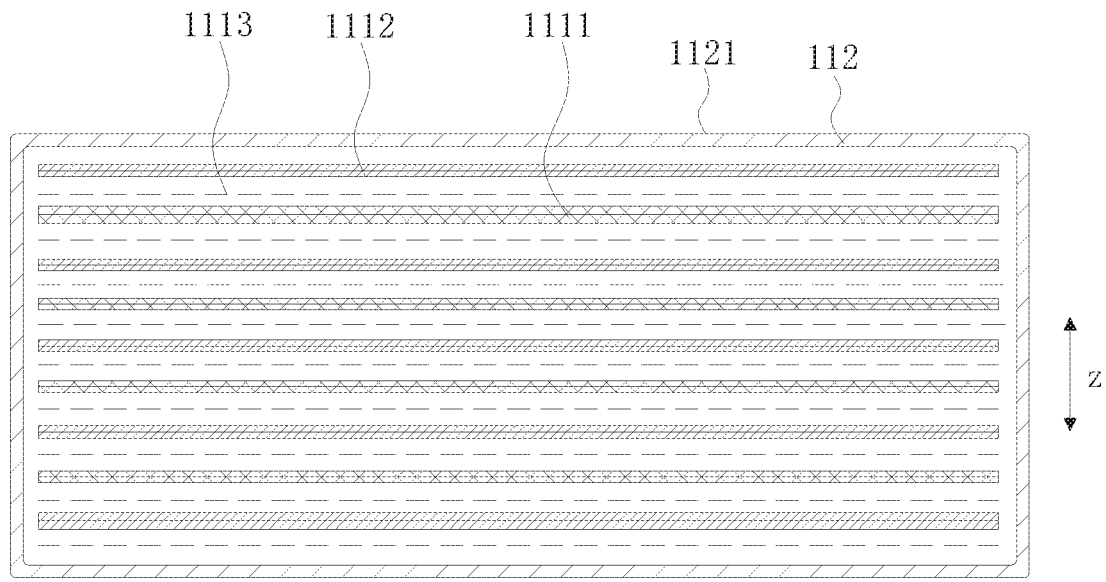
FIG. 12 is a cross-sectional view of a battery assembly in form of a layered structure according to a specific embodiment.

When the electrode assembly 111 is in form of a wound structure, as shown in FIG. 11, the electrode assembly 111 is flat, and the outer surfaces of the electrode assembly 111 include two flat surfaces 1114. The two flat surfaces 1114 face to each other in the vertical direction (the direction indicated by arrow z). In other words, the flat surfaces 1114 are opposite to the first surfaces 1121. The electrode assembly 111 has an approximately hexahedral form, and the flat surface 1114 is substantially parallel to a winding axis and is an outer surface having the largest area. The flat surface 1114 can be a relatively flat surface, rather than a strictly flat surface.

When the electrode assembly 111 is in form of a layered structure, as shown in FIG. 12, the first electrode plate 1111, the separator 1113, and the second electrode plate 1112 are stacked in the vertical direction (the direction indicated by arrow z), i.e., the first electrode plate 1111 face to the first surface 1121.

During a charging and discharging process, the electrode assembly 111 inevitably expands in a thickness direction of the first electrode plate 1111. In the electrode assembly 111 of the wound structure, an expansion force is greatest in a direction perpendicular to the flat surface 1114. In the electrode assembly 111 of the layered structure, the expansion force is greatest in a stacking direction of the first electrode plate 1111 and the second electrode plate 1112.

The electrode assembly 111 can adopt the wound structure or the layered structure. When the electrode assembly 111 is in form of the wound structure, the flat surfaces 1114 are located in the vertical direction (the direction indicated by arrow z). When the electrode assembly 111 is in form of the layered structure, the first electrode plate 1111 and the second electrode plate 1112 are stacked in the vertical direction (the direction indicated by arrow z). It can be seen that, whether the electrode assembly 111 adopts the wound structure or the layered structure, the maximum expansion force applied by the electrode assembly 111 on the battery casing 112 is oriented in the vertical direction.

On the contrary, in the battery unit 11 of the battery module 1 in the related art, the maximum expansion force applied by the electrode assembly 111 on the battery casing 112 is always oriented in the horizontal direction. The battery module 1 has a much greater size in the horizontal direction than that in the vertical direction. For example, due to the limitation on the height of a vehicle chassis, more battery units 11 have to be stacked in the horizontal direction, the expansion force is accumulated in the horizontal direction. In this regard, the battery module 1 is subjected to an extremely great expansion force in the horizontal direction, and it is necessary to provide very thick end plates on both sides of the battery module 1 in the horizontal direction to resist the expansion force. However, the increased thickness of the end plates can lower the energy density of the battery module 1. In the present embodiment, as the maximum expansion force applied by the electrode assembly 111 on the battery casing 112 is oriented in the vertical direction and the number of battery units 11 stacked in the vertical direction is smaller, the maximum expansion force of the battery module 1 is substantially reduced when compared with the related art.

The battery unit 11 can produce gas in the battery casing 112 during the charging and discharging process, the produced gas exerts a force on the battery casing 112, thereby intensifying the expansion of the battery casing 112. In the present disclosure, as the first surface 1121 has a larger area than the second surface 1122 and the two first surfaces 1121 of the battery unit 11 face to each other in the vertical direction, the maximum force applied by the produced gas on the battery casing 112 is also oriented in the vertical direction. Compared with the related art, the maximum expansion force of the battery module 1 is further reduced.

It should be understood that the embodiments according to the present disclosure discussed above are merely illustrative embodiments, but not intended to limit the present disclosure. The technical solution according to the present disclosure can be modified or changed in various manners. Based on the description or the accompanying drawing, any modifications, equivalent replacements, improvements, and direct or indirect applications in other related arts should fall within the scope of protection of the present disclosure.

What is claimed is:

1. A battery module, comprising:
a plurality of battery unit array structures, each of the plurality of battery unit array structures comprising a plurality of battery units arranged along a length direction, and a plurality of busbars electrically connected to the plurality of battery units; and
a battery container body, the container body comprising a first container body and a second container body that are in a split structure, the first container body being disposed at a side of the second container body in a width direction, the first container body being provided with a first accommodating cavity, and the second container body being provided with a second accommodating cavity, wherein
the plurality of battery unit array structures comprises at least one first battery unit array structure and at least one second battery unit array structure,
the at least one first battery unit array structure is disposed in the first accommodating cavity, and the at least one second battery unit array structure is disposed in the second accommodating cavity,
the first container body comprises a first upper cover portion and a first carrying portion, the first upper cover portion is disposed above the first carrying portion along a vertical direction, and the first accommodating cavity is formed between the first upper cover portion and the first carrying portion along the vertical direction,
the second container body comprises a second upper cover portion and a second carrying portion, the second upper cover portion is disposed above the second carrying portion along the vertical direction, and the second accommodating cavity is formed between the second upper cover portion and the second carrying portion along the vertical direction,
the battery module further comprises a fixing component disposed below both the first carrying portion and the second carrying portion along the vertical direction, wherein the first carrying portion and the second carrying portion are respectively connected to the fixing component with heat-conducting glue, so that the first carrying portion is connected to the second carrying portion through the fixing component during an assembling process of the battery module, and
the length direction, the width direction and the vertical direction are perpendicular to one another.

2. The battery module according to claim 1, wherein each of the plurality of battery units comprises a battery casing, a cover plate, and electrode terminals, the cover plate is connected to the battery casing, and the electrode terminals are provided on the cover plate and electrically connected to the plurality of busbars, the electrode terminals of the at least one first battery unit array structure face towards or away from the at least one second battery unit array structure, and the electrode terminals of the at least one second battery unit array structure face towards or away from the at least one first battery unit array structure.

3. The battery module according to claim 2, wherein the electrode terminals of the at least one first battery unit array structure face towards the at least one second battery unit array structure, and the electrode terminals of the at least one second battery unit array structure face towards the at least one first battery unit array structure.

4. The battery module according to claim 1, wherein each of the plurality of battery units comprises an electrode assembly accommodated in a battery casing, and the electrode assembly comprises a first electrode plate, a second electrode plate, and a separator disposed between the first electrode plate and the second electrode plate, the electrode assembly is in a wound structure, and outer surfaces of the electrode assembly comprises two flat surfaces face to each other in the vertical direction; or the electrode assembly is in a layered structure in which the first electrode plate, the separator and the second electrode plate are stacked in the vertical direction.

5. The battery module according to claim 1, wherein the first container body further comprises a first connecting portion disposed vertically, the first upper cover portion is connected to the first carrying portion through the first connecting portion, and the first connecting portion is disposed at a side of the at least one first battery unit array structure facing away from the at least one second battery unit array structure, and the second container body further comprises a second connecting portion disposed vertically, the second upper cover portion is connected to the second carrying portion through the second connecting portion, and the second connecting portion is disposed at a side of the at least one second battery unit array structure facing away from the at least one first battery unit array structure.

6. The battery module according to claim 1, wherein the first upper cover portion and the second upper cover portion are connected by welding, riveting, bonding or screwing.

7. The battery module according to claim 1, wherein the fixing component is a cooling plate.

8. The battery module according to claim 1, wherein the at least one first battery unit array structure is bonded to the first carrying portion through glue, and the at least one second battery unit array structure is bonded to the second carrying portion through glue.

9. The battery module according to claim 1, wherein the at least one first battery unit array structures comprises two or more first battery unit array structures arranged in the vertical direction, and the at least one second battery unit array structure comprises two or more second battery unit array structures arranged in the vertical direction.

10. The battery module according to claim 1, wherein a first opening is provided at an end of the first container body facing towards the second container body, and a second opening is provided at an end of the second container body facing towards the first container body, and the first opening is disposed opposite to the second opening.

11. A battery pack, comprising
an accommodating box; and
a plurality of battery module, each of the plurality of battery modules comprising:
a plurality of battery unit array structures, each of the plurality of battery unit array structures comprising a plurality of battery units arranged along a length direction, and a plurality of busbars electrically connected to the plurality of battery units; and
a battery container body, the container body comprising a first container body and a second container body that are in a split structure, the first container body being disposed at a side of the second container body in a width direction, the first container body being provided with a first accommodating cavity, and the second container body being provided with a second accommodating cavity, wherein
the plurality of battery unit array structures comprises at least one first battery unit array structure and at least one second battery unit array structure,
the at least one first battery unit array structure is disposed in the first accommodating cavity, and the at least one second battery unit array structure is disposed in the second accommodating cavity,
the first container body comprises a first upper cover portion and a first carrying portion, the first upper cover portion is disposed above the first carrying portion along a vertical direction, and the first accommodating cavity is formed between the first upper cover portion and the first carrying portion along the vertical direction,
the second container body comprises a second upper cover portion and a second carrying portion, the second upper cover portion is disposed above the second carrying portion along the vertical direction, and the second accommodating cavity is formed between the second upper cover portion and the second carrying portion along the vertical direction,
the battery module further comprises a fixing component disposed below both the first carrying portion and the second carrying portion along the vertical direction, wherein the first carrying portion and the second carrying portion are respectively connected to the fixing component with heat-conducting glue, so that the first carrying portion is connected to the second carrying portion through the fixing component during an assembling process of the battery module, and
the length direction, the width direction and the vertical direction are perpendicular to one another.

12. The battery pack according to claim 11, wherein the first container body comprises a first fixing portion extending in a direction facing away from the at least one second battery unit array structure, and the second container body comprises a second fixing portion extending in a direction facing away from the at least one first battery unit array structure, the accommodating box comprises a box cover and a box body, the box body is provided with a first fixing beam and a second fixing beam, and the first fixing beam and the second fixing beam protrude from a surface of the box body, the first fixing portion is disposed opposite to the first fixing beam, and the first fixing portion is fixed to the first fixing beam, the second fixing portion is disposed opposite to the second fixing beam, and the second fixing portion is fixed to the second fixing beam.

13. The battery pack according to claim 12, further comprising two pressing bars, wherein the first fixing portion is pressed between one of the two pressing bars and the first fixing beam, and the second fixing portion is pressed between the other one of the two pressing bars and the second fixing beam.

14. The battery module according to claim 1, wherein the first carrying portion and the second carrying portion are connected by welding, riveting or bonding or screwing.

* * * * *